(12) United States Patent
Neichev

(10) Patent No.: US 10,909,003 B2
(45) Date of Patent: Feb. 2, 2021

(54) DECOMMISSIONING DISASTER RECOVERY FOR A CLOUD BASED APPLICATION

(71) Applicant: SAP SE, Walldorf (DE)

(72) Inventor: Nikolai Neichev, Sofia (BG)

(73) Assignee: SAP SE, Walldorf (DE)

( * ) Notice: Subject to any disclaimer, the term of this patent is extended or adjusted under 35 U.S.C. 154(b) by 183 days.

(21) Appl. No.: 16/118,371

(22) Filed: Aug. 30, 2018

(65) Prior Publication Data

US 2020/0073764 A1 Mar. 5, 2020

(51) Int. Cl.
*G06F 17/00* (2019.01)
*G06F 11/14* (2006.01)
*G06F 16/27* (2019.01)

(52) U.S. Cl.
CPC ...... *G06F 11/1469* (2013.01); *G06F 11/1464* (2013.01); *G06F 16/27* (2019.01); *G06F 2201/805* (2013.01)

(58) Field of Classification Search
None
See application file for complete search history.

(56) References Cited

U.S. PATENT DOCUMENTS

| | | | | |
|---|---|---|---|---|
| 8,819,362 B1* | 8/2014 | Duprey | ............... | G06F 11/2082 711/162 |
| 8,996,827 B1* | 3/2015 | Natanzon | ................. | G06F 3/06 711/162 |
| 9,372,761 B1* | 6/2016 | Chai | .................... | G06F 11/1446 |
| 10,402,095 B1* | 9/2019 | Adams | ..................... | G06F 3/067 |
| 2013/0305083 A1* | 11/2013 | Machida | ................. | H04L 69/40 714/4.1 |
| 2016/0306719 A1* | 10/2016 | Laicher | ............... | G06F 11/2097 |
| 2017/0177454 A1* | 6/2017 | Ramasamy | ......... | G06F 11/2094 |
| 2017/0244593 A1* | 8/2017 | Rangasamy | ........ | H04L 12/4683 |
| 2018/0150356 A1* | 5/2018 | Boshev | ............... | G06F 16/9566 |
| 2018/0165185 A1* | 6/2018 | Boshev | ............... | G06F 11/0793 |
| 2019/0095289 A1* | 3/2019 | Kumar | ................ | G06F 11/1435 |
| 2019/0146884 A1* | 5/2019 | Gangadharappa | .. | G06F 11/1464 711/162 |

* cited by examiner

*Primary Examiner* — Hung D Le
(74) *Attorney, Agent, or Firm* — Mintz Levin Cohn Ferris Glovsky and Popeo, P.C.

(57) ABSTRACT

A method may include disabling disaster recovery for a cloud-based application by determining that a domain name system (DNS) service has been reconfigured to map a custom domain of the cloud-based application to a uniform resource locator (URL) of a first instance of the cloud-based application deployed at a first cloud platform landscape instead of a URL of a global traffic management (GTM) cluster. The GTM cluster may be reconfigured to remove configurations for directing, based on an availability of the first instance of the cloud-based application, requests for the cloud-based application to the first instance of the cloud-based application and/or a second instance of the cloud-based application deployed at the second cloud platform landscape. The DNS service and/or the GTM cluster may be reconfigured such that future requests for the cloud-based application are routed to the first instance of the cloud-based application and not the GTM cluster.

20 Claims, 5 Drawing Sheets

300

*Language: English (user profile language) ˅
*Priority: Medium ˅
*Subject: Premium Disaster Recovery Enablement
*Description:
Dear SAP Team, We would like to request the disablement of the SAP HANA Cloud Platform premium disaster recovery service for the following:
- <accounts>
- <applications>
- <database aliases>

Best regards,
<s-user name>

*Installation: 0090230460 - HANA CLOUD
*System: (PROD)
*Component: BC-NEO-OR

FIG. 3

DECOMMISSIONING DISASTER RECOVERY FOR A CLOUD BASED APPLICATION

FIELD

The present disclosure generally relates to cloud computing and, more specifically, to disaster recovery for a cloud based application.

BACKGROUND

Many businesses may rely on applications hosted on a cloud platform such as, for example, SAP HANA Cloud Platform, as provided by SAP SE, Walldorf, Germany. The cloud platform may be configured to provide remote resources (e.g., servers, databases, and/or the like) for storing, managing, and/or processing data. However, the cloud platform may be susceptible to failures triggered, for example, by natural and/or manmade disasters. Failures at the cloud platform may lead to costly data loss and/or service interruptions.

SUMMARY

Methods, systems, and articles of manufacture, including computer program products, are provided for decommissioning disaster recovery. In one aspect, there is provided a system including at least one processor and at least one memory. The at least one memory can store instructions that cause operations when executed by the at least one processor. The operations can include: receiving, from a client, a request to disable disaster recovery for a cloud-based application, the cloud-based application being deployed as a first instance of the cloud-based application at a first cloud platform landscape and a second instance of the cloud-based application at a second cloud platform landscape; responding to the request to disable disaster recovery by at least determining that a domain name system (DNS) service has been reconfigured to map a custom domain of the cloud-based application to a uniform resource locator (URL) of the first instance of the cloud-based application instead of a URL of a global traffic management (GTM) cluster, the GTM cluster being configured to direct, based at least on an availability of the first instance of the cloud-based application, one or more requests for the cloud-based application to the first instance of the cloud-based application and/or the second instance of the cloud-based application; and upon determining that the DNS service has been reconfigured to map the custom domain of the cloud-based application to the URL of the first instance of the cloud-based application, reconfiguring the GTM cluster to at least remove, from the GTM cluster, configurations for directing the one or more requests for the cloud-based application to the first instance of the cloud-based application and/or the second instance of the cloud-based application based at least on the availability of the first instance of the cloud-based application.

In some variations, one or more of the features disclosed herein including the following features can optionally be included in any feasible combination. The first instance of the cloud-based application may be determined to be operational subsequent to the reconfiguration of the GTM cluster and/or the DNS service. In response to the first instance of the cloud-based application being operational, the first cloud platform landscape and/or the second cloud platform landscape may be reconfigured to at least cease a replication of configurations and/or data from the first cloud platform landscape to the second cloud platform landscape.

In some variations, the reconfiguration of the first cloud platform landscape and/or the second cloud platform landscape may includes removing, from the second cloud platform landscape, the second instance of the cloud-based application. The removing of the second instance of the cloud-based application from the second cloud platform landscape may include removing, from a database at the second cloud platform landscape, data associated with the first instance of the cloud-based application. The data may be replicated from another database at the first cloud platform landscape to the database at the second cloud platform landscape.

In some variations, the DNS service may include a canonical name (CNAME) record mapping the custom domain of the cloud-based application to the URL of the GTM cluster while the disaster recovery is enabled for the cloud-based application. The DNS service may be reconfigured by at least modifying the CNAME record to map the custom domain of the cloud-based application to the URL of the first instance of the cloud-based application instead of the URL of the GTM cluster. The one or more requests for the cloud-based application may be routed, based at least on the modified CNAME record, to the first instance of the cloud-based application. The modifying of the CNAME record may prevent the one or more requests for the cloud-based application from being routed to the GTM cluster.

In some variations, the second instance of the cloud-based application may be a fully operational copy of the first instance of the cloud-based application.

In some variations, the GTM cluster may be configured to route, to the second instance of the cloud-based application, the one or more requests for the cloud-based application based at least on the first instance of the cloud-based application being unavailable.

In some variations, the request from the client may be a ticket. The ticket may be updated based at least on whether the DNS service has been reconfigured to map the custom domain of the cloud-based application to the URL of the first instance of the cloud-based application. The ticket may be further updated to notify the client that the disaster recovery has been disabled for the cloud-based application.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the decommissioning of disaster recovery, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3 depicts a disaster recovery enablement ticket consistent with implementations of the current subject matter;

Figure 1:
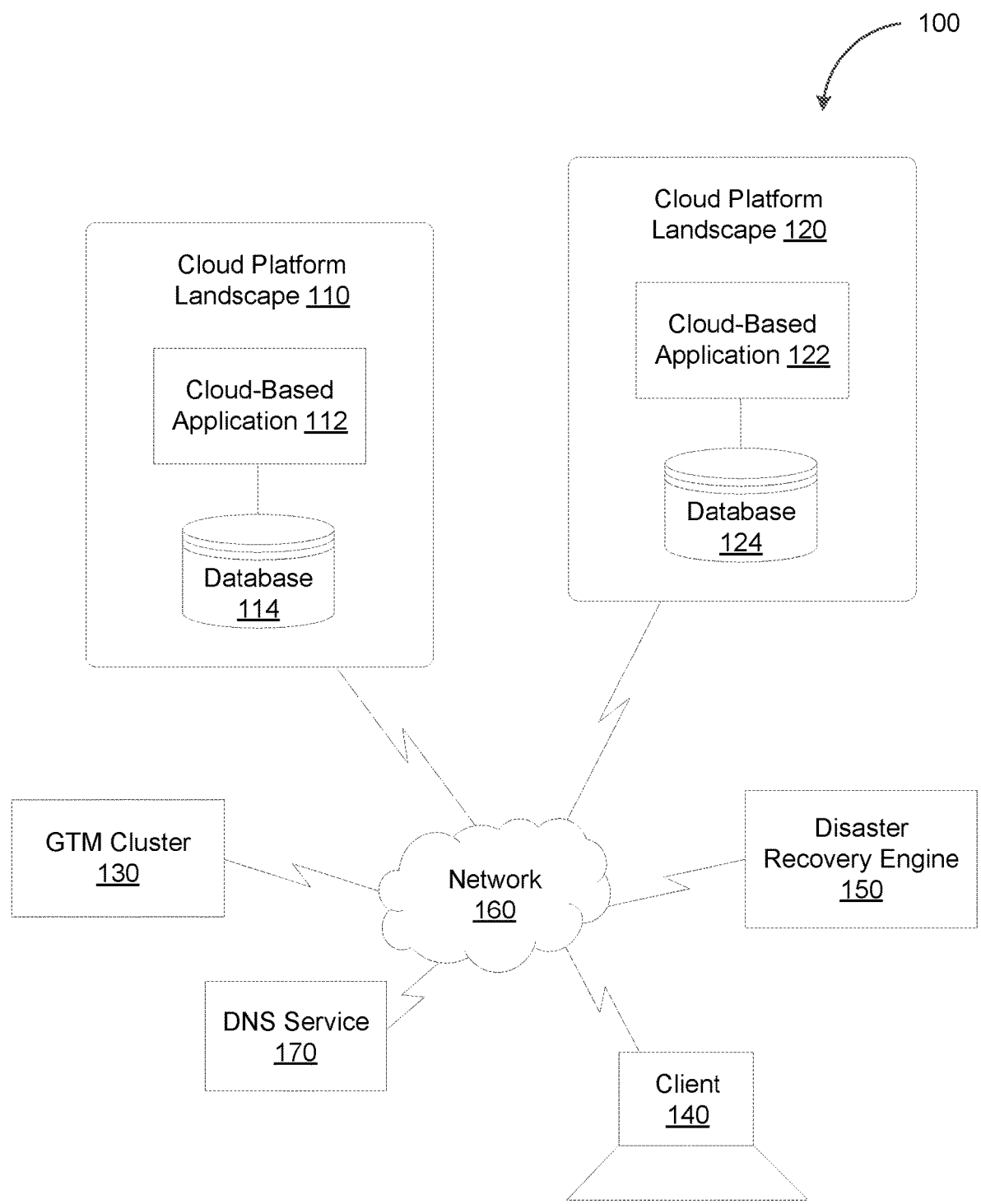
FIG. 1 depicts a system diagram illustrating a disaster recovery system consistent with implementations of the current subject matter.

Like labels are used to refer to same or similar items in the drawings.

DETAILED DESCRIPTION

Disaster recovery measures may be implemented to minimize data loss and downtime in the event that a primary cloud platform landscape hosting a primary instance of a cloud-based application fails, for example, due to a natural and/or manmade disaster. For example, disaster recovery measures may include deploying, at a secondary cloud platform landscape, a secondary instance of the cloud-based application, which may be a fully operational copy of the primary instance of the cloud-based application. That is, data and/or configurations from the primary instance of the cloud-based application may be replicated at the secondary instance of the cloud-based application in order for the second instance of the cloud-based application to provide the same functionalities as the primary instance of the cloud-based application. Thus, in the event of a failure at the primary cloud platform, the secondary instance of the cloud-based application may replace the primary instance of the cloud-based application. For instance, requests for the cloud-based application may be routed to the secondary instance of the cloud-based application hosted at the secondary cloud platform instead of the primary instance of the cloud-based application hosted at the primary cloud platform. However, once disaster recovery measures are enabled for a cloud-based application, subsequently disabling the disaster recovery measures may be a time consuming and convoluted procedure that requires frequent manual intervention. As such, in some implementations of the current subject matter, a disaster recovery engine may be configured to automate the decommissioning of disaster recovery measures for the cloud-based application.

In some example embodiments, disaster recovery measures for a cloud-based application may include configuring a domain name system (DNS) service to map a custom domain of the cloud-based application to a uniform resource locator (URL) of a global traffic management (GTM) cluster. For example, the DNS service may maintain a canonical name (CNAME) record that maps the custom domain of the cloud-based application to the URL of the GTM cluster. The GTM cluster may be configured to direct requests for the cloud-based application to either a primary instance of the cloud-based application at a primary cloud platform landscape or a secondary instance of the cloud-based application at a secondary cloud platform landscape depending on the availability of the primary instance of the cloud-based application. For instance, in the event the primary instance of the cloud-based application becomes unavailable due to a failure at the primary cloud platform landscape, the GTM cluster may perform a traffic switch from the primary instance of the cloud-based application to the secondary instance of the cloud-based application. The traffic switch may include directing requests to the secondary instance of the cloud-based application at the secondary cloud platform landscape instead of the primary instance of the cloud-based application at the primary cloud platform landscape.

In some implementations of the current subject matter, decommissioning disaster recovery measures for the cloud-based application may include reconfiguring the DNS service to replace the URL for the GTM cluster with an URL for the primary instance of the cloud-based application. For example, the reconfiguration of the DNS service may include modifying the CNAME record at the DNS service to map the custom domain of the cloud-based application to the URL of the primary instance of the cloud-based application instead of the URL of the GTM cluster. The modification of the CNAME record at the DNS service may prevent further requests for the cloud-based application from being routed to the GTM cluster, where the requests may be further routed to the primary instance of the cloud-based application or the secondary instance of the cloud-based application depending on the availability of the primary instance of the cloud-based application. Alternatively and/or additionally, decommissioning of disaster recovery measures for the cloud-based application may include reconfiguring the GTM cluster. For instance, the reconfiguration of the GTM cluster may include by removing, from the GTM cluster, configurations for routing requests to the cloud-based application to the primary instance of the cloud-based application or the secondary instance of the cloud-based application. Upon decommissioning disaster recovery measures for the cloud-based application, further requests for the cloud-based application may be routed directly to the primary instance of the cloud-based application instead of the GTM cluster, even when the primary instance of the cloud-based application is unavailable due to natural and/or manmade disaster at the primary cloud platform landscape.

As noted, enabling of disaster recovery measures for the primary instance of the cloud-based application may include deploying the secondary instance of the cloud-based application at the secondary cloud platform landscape. Deploying the secondary instance of the cloud-based application may include replicating, at the secondary instance of the cloud-based application, the configurations (e.g., custom domain, destinations, and/or the like) that are applied to the primary instance of the cloud-based application. Furthermore, data associated with the primary instance of the cloud-based application, which may be stored in a primary database at the primary cloud platform landscape, may also be replicated at a secondary database in the secondary cloud platform landscape such that the secondary instance of the cloud-based application may be a fully operational copy of the primary instance of the cloud-based application. Accordingly, in order to decommission disaster recovery measures for the cloud-based application, the disaster recovery engine may remove, from the secondary cloud platform landscape, the secondary instance of the cloud-based application deployed at the secondary cloud platform landscape including the replicated data at the secondary database. Alternatively and/or additionally, decommissioning disaster recovery measures for the cloud-based application may include ceasing the replication of configurations and/or data associated with the primary instance of the cloud-based application to the secondary instance of the cloud-based application.

FIG. 1 depicts a system diagram illustrating a disaster recovery system 100 consistent with implementations of the current subject matter. Referring to FIG. 1, the disaster recovery system 100 may include a first cloud platform landscape 110, a second cloud platform landscape 120, a GTM cluster 130, a client 140, a disaster recovery engine 150, and a DNS service 170. As shown in FIG. 1, the first cloud platform landscape 110, the second cloud platform landscape 120, the GTM cluster 130, the client 140, the disaster recovery engine 150, and/or the DNS service 170 may be communicatively coupled via a network 160. It should be appreciated that the network 160 may be any wired and/or wireless network including, for example, a wide area network (WAN), local area network (LAN), a virtual local area network (VLAN), the Internet, and/or the like. Meanwhile, the GTM cluster 130 may include one or more devices configured to provide application delivery functionalities including, for example, load balancing, traffic routing, and/or the like.

As shown in FIG. 1, a first instance of the cloud-based application 112 may be deployed at the first cloud platform landscape 110. In addition, data associated with the first instance of the cloud-based application 112 can be stored in a first database 114 at the first cloud platform landscape 110. The data associated with the first instance of the cloud-based application 112 may include, for example, configurations, subscriptions, tenants, destinations (e.g., connectivity configurations to other applications), roles, permissions, assignments, members, and/or the like.

Referring again to FIG. 1, disaster recovery measures for the cloud-based application may include deploying a fully operational copy of the cloud-based application at another cloud platform landscape. For example, a second instance of the cloud-based application 122 may be deployed at the second cloud platform landscape 120. Configurations applied at the first instance of the cloud-based application 112 may also be applied to the second instance of the cloud-based application 124 including, for example, a custom domain for the cloud-based application, permissions (e.g., administrators, developers, and/or the like), subscriptions (e.g., to other applications, accounts, and/or the like), destinations (e.g., connectivity to other applications), and/or the like. Furthermore, data from the first database 114 may be replicated at a second database 124 in the second cloud platform landscape 120. By replicating data and/or configurations from the first instance of the cloud-based application 112 to the second instance of the cloud-based application 122, the second instance of the cloud-based application 122 may be a fully operational copy of the first instance of the cloud-based application 112.

A browser at the client 140 may resolve one or more hypertext transfer protocol (HTTP) requests for the custom domain of the cloud-based application by at least requesting the DNS service 170 to provide a mapping for the custom domain of the cloud-based application. When disaster recovery measures are enabled for the cloud-based application, the DNS service 170 may be configured to provide a mapping between the custom domain of the cloud-based application to a URL of the GTM cluster 130. For example, the DNS service 170 may maintain a CNAME record mapping the custom domain of the cloud-based application to the URL of the GTM cluster 130. As such, when disaster recovery measures are enabled for the cloud-based application, requests for the cloud-based application may be directed to the GTM cluster 130 instead of directly to the first instance of the cloud-based application 112 or the second instance of the cloud-based application 122. Meanwhile, the GTM cluster 130 may be configured to direct the requests for the cloud-based application depending on the availability of the first instance of the cloud-based application 112. For instance, while the first instance of the cloud-based application is 112 is available, the GTM cluster 130 may direct requests for the cloud-based application to the first instance of the cloud-based application 112 at the first cloud platform landscape 110. Alternately and/or additionally, in the event the first instance of the cloud-based application 112 is unavailable (e.g., due to a failure at the first cloud platform landscape 110), the GTM cluster 130 may direct requests for the cloud-based application to the second instance of the cloud-based application 122 at the second cloud platform landscape 120 instead of to the first instance of the cloud-based application 112 at the first cloud platform landscape 110.

In some implementations of the current subject matter, the disaster recovery engine 150 may be configured to disable disaster recovery measures for the cloud-based application. For example, the disaster recovery engine 150 may receive, from the client 140, a ticket requesting the disablement of disaster recovery measures for the cloud-based application. To further illustrate, FIG. 3 depicts a ticket 300 consistent with some implementations of the current subject matter. The client 140 may submit, to the disaster recovery engine 150, the ticket 300 in order to disable the disaster recovery measures enabled for the cloud-based application. Meanwhile, the disaster recovery engine 150 may respond to the ticket 300 by at least disabling the disaster recovery measures enabled for the cloud-based application.

As noted, enabling disaster recovery measures for the cloud-based application may include deploying, at the second cloud platform landscape 120, the second instance of the cloud-based application 122, which may be a fully operational copy of the first instance of the cloud-based application 112. The first cloud platform landscape 110 (e.g., the first database 114) and/or the second cloud platform landscape 120 may further be reconfigured to cease the replication of data and/or configurations from the first cloud platform landscape 110 to the second cloud platform landscape 120. Furthermore, the disaster recovery measures may include reconfiguring the DNS service 170, for example, by modifying a CNAME record at the DNS service 170, to map the custom domain of the cloud-based application to a URL associated with the first instance of the cloud-based application 112 instead of the URL associated with the GTM cluster 130. Meanwhile, the GTM cluster 130 may be reconfigured to remove configurations for routing requests for the cloud-based application to the first instance of the cloud-based application 112 or the second instance of the cloud-based application 114 depending on the availability of the first instance of the cloud-based application 112.

Accordingly, in response receiving the ticket 300 from the client 140, the disaster recovery engine 150 may determine whether the DNS service 170 has been reconfigured to direct requests for the cloud-based service to the first instance of the cloud-based application 112 and not the GTM cluster 130. For example, the disaster recovery engine 150 may verify that the CNAME record at the DNS service 170 has been modified to map the custom domain of the cloud-based application to the URL associated with the first instance of the cloud-based application 112 instead of the URL associated with the GTM cluster 130, as would be the case when disaster recovery measures are enabled for the cloud-based application. Upon determining that the DNS service 170 has been reconfigured to direct requests for the cloud-based service to the first instance of cloud-based application 112, the disaster recovery engine 150 may further reconfigure the GTM cluster 130 to remove, for example, configurations for routing, based on the availability of the first instance of the cloud-based application 112, requests for the cloud-based application to the first instance of the cloud-based application 112 or the second instance of the cloud-based application 122.

In some implementations of the current subject matter, subsequent to the reconfiguration of the GTM cluster 130 and/or the DNS service 170, the disaster recovery engine 150 may determine whether the first instance of the cloud-based application 112 at the first cloud platform landscape 110 remains operational. For example, the client 140 may indicate, via the ticket 300, that the first instance of the cloud-based application 112 remains operational after the reconfiguration of the GTM cluster 130 and/or the DNS service 170. If the first instance of the cloud-based application 112 is determined to be operational, the disaster recovery engine 150 may complete the decommissioning of disaster recovery measures by at least removing, from the second cloud platform landscape 120, the second instance of the cloud-based application 122. The disaster recovery engine 150 may further configure the first cloud platform landscape 110 (e.g., the first database 114) and/or the second cloud platform landscape 120 (e.g., the second database 124) to cease the replication of data and/or configurations from the first cloud platform landscape 110 to the second cloud platform 120. Upon completing the decommissioning of disaster recovery measures, the disaster recovery engine 150 may close the ticket 300. The disaster recovery engine 150 may further send, to the client 140, a notification that the decommissioning of disaster recovery measures is complete and/or that the secondary cloud platform landscape 120 may be available to the client 140 for other uses. As noted, once the decommissioning of disaster recovery measures is complete, requests for the cloud-based application may be routed directly to the first instance of the cloud-based application 112 at the first cloud platform landscape 110. That is, requests for the cloud-based application may no longer be routed to the GTM cluster 130 where the requests may be redirected to the second instance of the cloud-based application 122 whenever the first instance of the cloud-based application 112 is unavailable.

Figure 2:
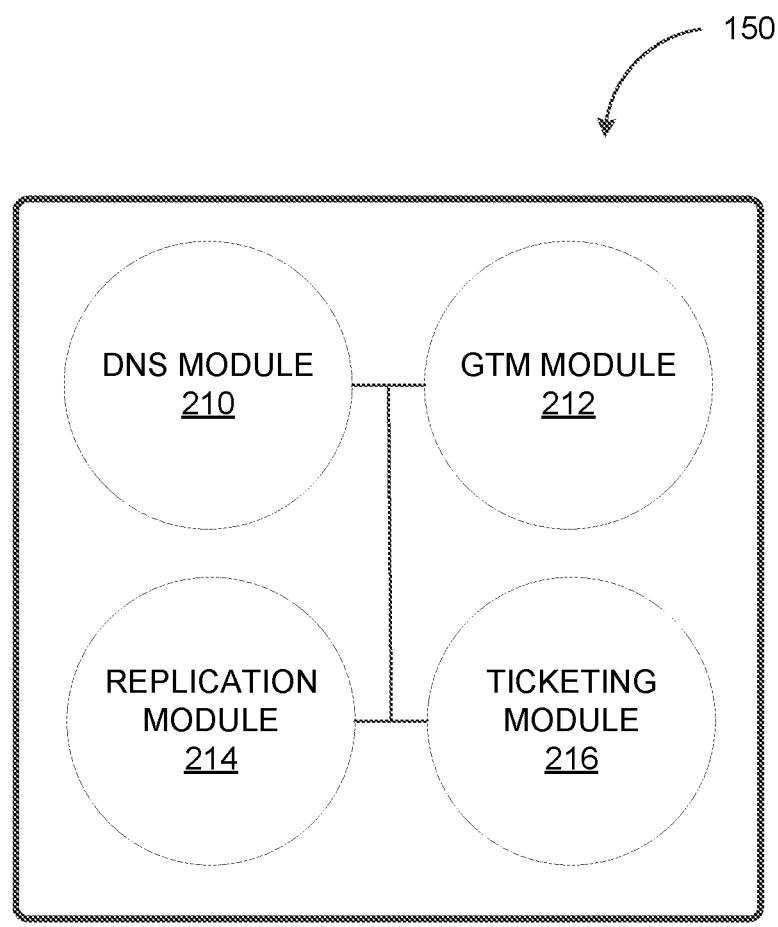
FIG. 2 depicts a block diagram illustrating a disaster recovery engine consistent with implementations of the current subject matter.

FIG. 2 depicts a block diagram illustrating the disaster recovery engine 150 consistent with implementations of the current subject matter. Referring to FIGS. 1-2, the disaster recovery engine 150 may include a DNS module 210, a GTM module 212, a replication module 214, and a ticketing module 216. It should be appreciated that the disaster recovery engine 150 can include additional and/or different modules without departing from the scope of the present disclosure.

In some implementations of the current subject matter, the DNS module 210 may decommission disaster recovery measures for the cloud-based application by at least determining whether the DNS service 170 has been reconfigured, for example, by the client 140, to map the custom domain of the cloud-based application to the first instance of the cloud-based application 112 at the first cloud platform landscape 110 instead of the GTM cluster 130. As noted, the DNS service 170 may maintain a CNAME record that maps the custom domain of the cloud-based application to the URL of the GTM cluster 130 when disaster recovery measures for the cloud-based application are in place. In order to disable the disaster recovery measures for the cloud-based application, the client 140 may modify the CNAME record to map the custom domain of the cloud-based application to the URL of the first instance of the cloud-based application 112 at the cloud platform landscape 110. As such, in order to decommission disaster recovery measures for the cloud-based application, the DNS module 210 may determine whether the CNAME record at the DNS service 170 has been modified to map the custom domain of the cloud-based application to the URL of the first instance of the cloud-based application 112 and not the URL of the GTM cluster 130.

In some implementations of the current subject matter, the GTM module 212 may decommission disaster recovery measures for the cloud-based application by at least reconfiguring the GTM cluster 130. For example, the GTM module 212 may reconfigure the GTM cluster 130 by at least removing, from the GTM cluster 130, configurations for routing requests for the cloud-based application to the first instance of the cloud-based application 112 or the second instance of the cloud-based application 114 depending on the availability of the first instance of the cloud-based application 112.

In some implementations of the current subject matter, the replication module 214 may decommission disaster recovery measures for the cloud-based application by at least removing, from the second cloud platform landscape 120, the second instance of the cloud-based application 124. Furthermore, the replication module 214 may reconfigure the first cloud platform landscape 110 and/or the second cloud platform landscape 120 to cease the replication of configurations and/or data from the first cloud platform landscape 110 to the second cloud platform landscape 120. As noted, when disaster recovery measures are enabled for the cloud-based application, the configurations (e.g., custom domain, destinations, and/or the like) that are applied to the first instance of the cloud-based application 112 are also applied to the second instance of the cloud-based application 122. Furthermore, data associated with the first instance of the cloud-based application 112, which may be stored in the first database 114 at the first cloud platform landscape 110, may also be replicated to the second database 124 in the second cloud platform landscape 120. The replication of configurations and/or data may ensure that the secondary instance of the cloud-based application 122 may be a fully operational copy of the first instance of the cloud-based application 112. Accordingly, in order to decommission disaster recovery measures for the cloud-based application, the replication module 214 may remove, from the second cloud platform landscape 120 including the second database 124, configurations and/or data that have been replicated from the first cloud platform landscape 110 including the first database 114. The first cloud platform landscape 110 and/or the second cloud platform landscape 120 may further be reconfigured to cease further replication of configurations and/or data associated with the first instance of the cloud-based application 112.

In some implementations of the current subject matter, the ticketing module 216 may be configured to receive, generate, and/or update one or more tickets as part of coordinating the decommissioning of disaster recovery measures for the cloud-based application. For instance, as noted, the ticketing module 216 may receive, from the client 140, the ticket 300 requesting the disablement of disaster recovery measures for the cloud-based application. Alternatively and/or additionally, the ticketing module 216 may update the ticket 300 based on a status of the reconfiguration of the GTM cluster 130 and/or the DNS service 170. For example, the ticket 300 may be updated to indicate whether the GTM cluster 130 and/or the DNS service 170 have been successfully reconfigured to disable disaster recovery measures for the cloud-based application. The ticketing module 216 may further update the ticket 300 to indicate when the decommissioning of disaster recovery measures is complete.

In some implementations of the current subject matter, the ticketing module 216 may also generate one or more tickets (e.g., PRODPULL tickets and/or the like) requesting the reconfiguration of the first cloud platform landscape 110 and/or the second cloud platform landscape 120. For example, the ticketing module 216 may generate one or more tickets that triggers the removal of the second instance of the cloud-based application 122 from the second cloud platform landscape 120. Alternatively and/or additionally, the one or more tickets may trigger the cessation of the replication of configurations and/or data from the first cloud platform landscape 110 (e.g., the first database 114) to the second cloud platform landscape (e.g., the second database 124).

Figure 4:
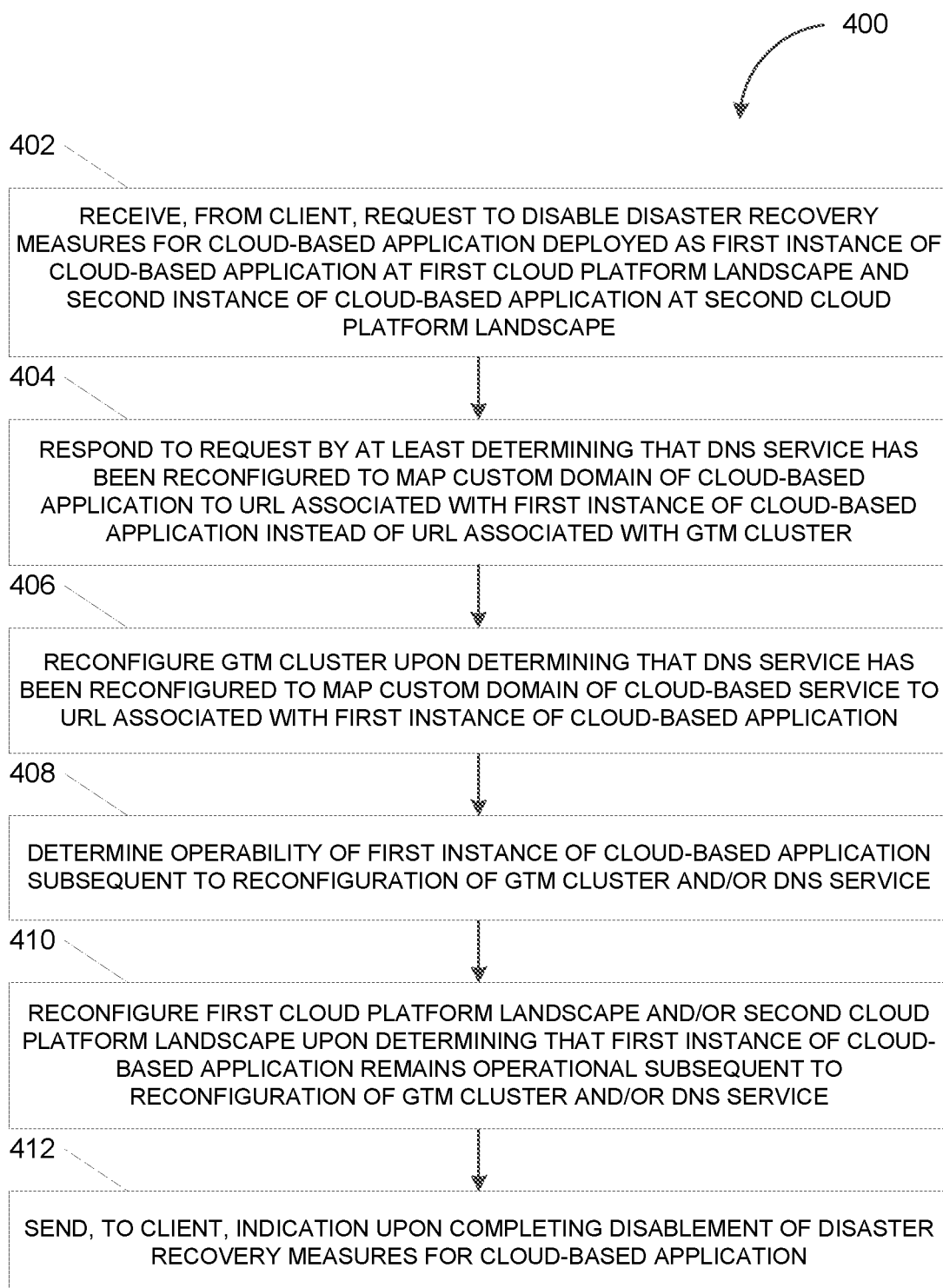
FIG. 4 depicts a flowchart illustrating a process for decommissioning disaster recovery consistent with implementations of the current subject matter.

FIG. 4 depicts a flowchart illustrating a process 400 for disabling disaster recovery consistent with implementations of the current subject matter. Referring to FIGS. 1-4, the process 400 may be performed by the disaster recovery engine 150.

The disaster recovery engine 150 may receive, from the client 140, a request to disable disaster recovery measures for a cloud-based application deployed as the first instance of the cloud-based application 112 at the first cloud platform landscape 110 and the second instance of the cloud-based application 122 at the second cloud platform landscape 120 (402). For instance, the disaster recovery engine 150, for example, the ticketing module 216, may receive, from the client 140, the ticket 300 requesting the disablement of disaster recovery measures for a cloud-based application. As shown in FIG. 1, the first instance of the cloud-based application 112 may be deployed at the first cloud platform landscape 110 and the second instance of the cloud-based application 122 may be deployed at the second cloud platform landscape 120. The second instance of the cloud-based application may be a fully operational copy of the first instance of the cloud-based application 110. For example, the same configurations that are applied to the first instance of the cloud-based application 112 may also be applied to the second instance of the cloud-based application 122. Furthermore, data associated with the first instance of the cloud-based application 122, which may be stored in the first database 114 at the first cloud platform landscape 110, may be replicated to the second cloud platform landscape 120 and stored in the second database 124 at the second cloud platform landscape 120.

The disaster recovery engine 150 may respond to the request by at least determining that the DNS service 170 has been reconfigured to map the custom domain of the cloud-based service to the URL associated with the first instance of the cloud-based application 112 instead of the URL associated with the GTM cluster 130 (404). For example, the disaster recovery engine 150, for example, the DNS module 210, may respond to the request from the client 140 (e.g., the ticket 300) by determining whether the CNAME record at the DNS service 170 has been modify to map the custom domain of the cloud-based application to the URL associated with the first instance of the cloud-based application 112 and not the URL associated with the GTM cluster 130. As noted, modifying the CNAME record at the DNS service 170 may prevent future requests for the cloud-based application from being routed to the GTM cluster 130, where the requests may be further routed to the first instance of the cloud-based application 112 or the second instance of the cloud-based application 122 depending on the availability of the first instance of the cloud-based application 112.

The disaster recovery engine 150 may reconfigure the GTM cluster 130 upon determining that the DNS service 170 has been reconfigured to map the custom domain of the cloud-based service to the URL associated with the first instance of the cloud-based application 112 (406). For example, the disaster recovery engine 150, for example, the GTM module 212, may reconfigure the GTM cluster 130 to at least remove, from the GTM cluster 130, configurations for routing requests for the cloud-based application to the first instance of the cloud-based application 112 or the second instance of the cloud-based application 114 depending on the availability of the first instance of the cloud-based application 112.

The disaster recovery engine 150 may determine the operability of the first instance of the cloud-based application 112 subsequent to the reconfiguration of the GTM cluster 130 and/or the DNS service 170 (408). For example, the disaster recovery engine 150 may receive, from the client 140, an updated ticket 300 indicating whether the first instance of the cloud-based application 112 remains available after the reconfiguration of the GTM cluster 130 and/or the DNS service 170. As noted, the GTM cluster 130 and/or the DNS service 170 may be reconfigured to prevent future requests for the cloud-based application from being routed to the GTM cluster 130 and/or rerouted to the second instance of the cloud-based application 122 when the first instance of the cloud-based application 112 is unavailable. Instead, the GTM cluster 130 and/or the DNS service 170 may be reconfigured such that future requests for the cloud-based application are routed to the first instance of the cloud-based application 112 at the first cloud platform landscape 110, even when the first instance of the cloud-based application 112 has been rendered unavailable, for example, by a failure at the first cloud platform landscape 110.

The disaster recovery engine 150 may reconfigure the first cloud platform landscape 110 and/or the second cloud platform landscape 120 upon determining that the first instance of the cloud-based application 112 remains operational subsequent to the reconfiguration of the GTM cluster 130 and/or the DNS service 170 (410). For instance, upon determining that the first instance of the cloud-based application 112 is available after the reconfiguration of the GTM cluster 130 and/or the DNS service 170, the disaster recovery engine 150, for example, the replication module 214, may complete the decommissioning of disaster recovery services by at least removing, from the second cloud platform landscape 120, the second instance of the cloud-based application 122. Alternatively and/or additionally, the disaster recovery engine 150 may complete the decommissioning of disaster recovery measures by at least configuring the first cloud platform landscape 110 (e.g., the first database 114) and/or the second cloud platform landscape 120 (e.g., the second database 124) to cease the replication of data and/or configurations from the first cloud platform landscape 110 to the second cloud platform 120. Once the decommissioning of disaster recovery measures is complete, requests for the cloud-based application may be routed directly to the first instance of the cloud-based application 112 at the first cloud platform landscape 110. That is, requests for the cloud-based application may no longer be routed to the GTM cluster 130 where the requests may be redirected to the second instance of the cloud-based application 122 whenever the first instance of the cloud-based application 112 is unavailable.

The disaster recovery engine 150 may send, to the client 140, an indication upon completing the disablement of disaster recovery measures for the cloud-based application (412). For example, upon completing the decommissioning of disaster recovery measures, the disaster recovery engine 150, for example, the ticketing module 216, may close the ticket 300. The disaster recovery engine 150 may further send, to the client 140, a notification that the decommissioning of disaster recovery measures is complete and/or that the secondary cloud platform landscape 120 may be available to the client 140 for other uses.

Figure 5:
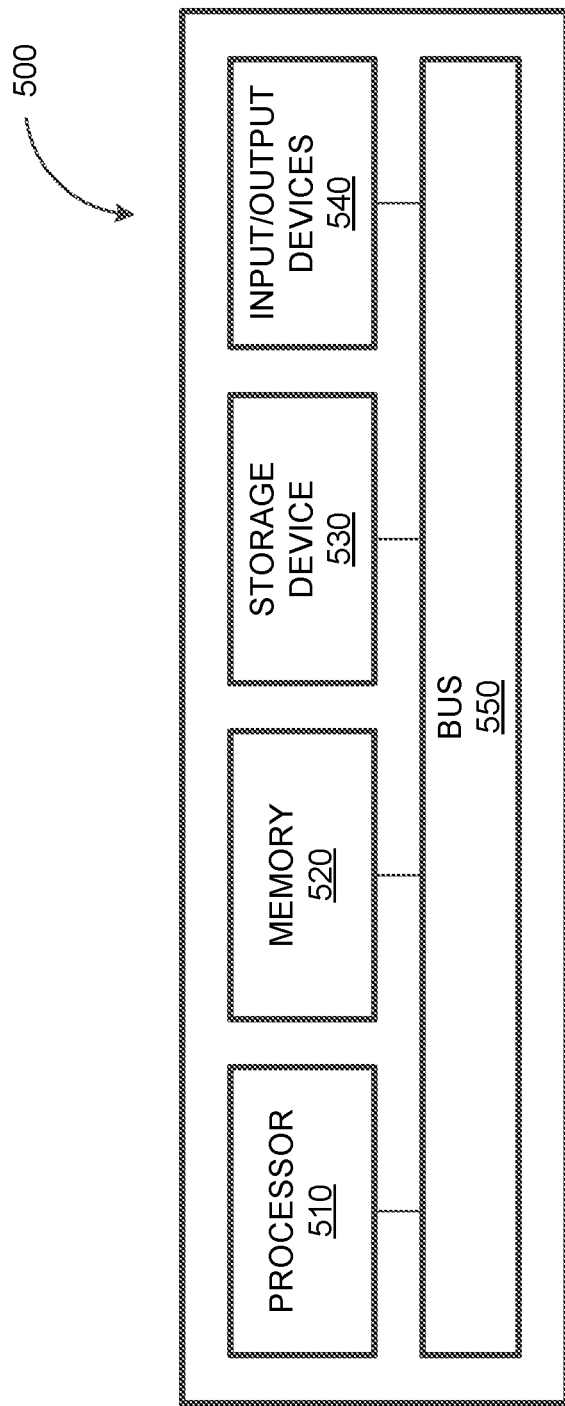
FIG. 5 depicts a block diagram illustrating a computing system consistent with implementations of the current subject matter.

FIG. 5 depicts a block diagram illustrating a computing system 500 consistent with implementations of the current subject matter. Referring to FIGS. 1 and 5, the computing system 500 can be used to implement the disaster recovery engine 150 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the disaster recovery engine 150. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one data processor; and
   at least one memory storing instructions, which when executed by the at least one data processor, result in operations comprising:
   receiving, from a client, a request to disable disaster recovery for a cloud-based application, the cloud-based application being deployed as a first instance of the cloud-based application at a first cloud platform and a second instance of the cloud-based application at a second cloud platform;
   responding to the request to disable disaster recovery by at least determining that a domain name system (DNS) service has been reconfigured to map a custom domain of the cloud-based application to a uniform resource locator (URL) of the first instance of the cloud-based application instead of a URL of a global traffic management (GTM) cluster, the GTM cluster being configured to direct, based at least on an availability of the first instance of the cloud-based application, one or more requests for the cloud-based application to the first instance of the cloud-based application and/or the second instance of the cloud-based application; and
   upon determining that the DNS service has been reconfigured to map the custom domain of the cloud-based application to the URL of the first instance of the cloud-based application, reconfiguring the GTM cluster to at least remove, from the GTM cluster, configurations for directing the one or more requests for the cloud-based application to the first instance of the cloud-based application and/or the second instance of the cloud-based application based at least on the availability of the first instance of the cloud-based application.

2. The system of claim 1, further comprising:
   determining that the first instance of the cloud-based application is operational subsequent to the reconfiguration of the GTM cluster and/or the DNS service; and
   in response to the first instance of the cloud-based application being operational, reconfiguring the first cloud platform and/or the second cloud platform to at least cease a replication of configurations and/or data from the first cloud platform to the second cloud platform.

3. The system of claim 2, wherein the reconfiguration of the first cloud platform and/or the second cloud platform further includes removing, from the second cloud platform, the second instance of the cloud-based application.

4. The system of claim 3, wherein the removing of the second instance of the cloud-based application from the second cloud platform includes removing, from a database at the second cloud platform, data associated with the first instance of the cloud-based application, and wherein the data is replicated from another database at the first cloud platform to the database at the second cloud platform.

5. The system of claim 1, wherein the DNS service includes a canonical name (CNAME) record mapping the custom domain of the cloud-based application to the URL of the GTM cluster while the disaster recovery is enabled for the cloud-based application, and wherein the DNS service is reconfigured by at least modifying the CNAME record to map the custom domain of the cloud-based application to the URL of the first instance of the cloud-based application instead of the URL of the GTM cluster.

6. The system of claim 5, wherein the one or more requests for the cloud-based application are routed, based at least on the modified CNAME record, to the first instance of the cloud-based application, and wherein the modifying of the CNAME record prevents the one or more requests for the cloud-based application from being routed to the GTM cluster.

7. The system of claim 1, wherein the second instance of the cloud-based application comprises a fully operational copy of the first instance of the cloud-based application.

8. The system of claim 1, wherein the GTM cluster is configured to route, to the second instance of the cloud-based application, the one or more requests for the cloud-based application based at least on the first instance of the cloud-based application being unavailable.

9. The system of claim 1, wherein the request from the client comprises a ticket, and wherein the ticket is updated based at least on whether the DNS service has been reconfigured to map the custom domain of the cloud-based application to the URL of the first instance of the cloud-based application.

10. The system of claim 9, wherein the ticket is further updated to notify the client that the disaster recovery has been disabled for the cloud-based application.

11. A computer-implemented method, comprising:
receiving, from a client, a request to disable disaster recovery for a cloud-based application, the cloud-based application being deployed as a first instance of the cloud-based application at a first cloud platform and a second instance of the cloud-based application at a second cloud platform;
responding to the request to disable disaster recovery by at least determining that a domain name system (DNS) service has been reconfigured to map a custom domain of the cloud-based application to a uniform resource locator (URL) of the first instance of the cloud-based application instead of a URL of a global traffic management (GTM) cluster, the GTM cluster being configured to direct, based at least on an availability of the first instance of the cloud-based application, one or more requests for the cloud-based application to the first instance of the cloud-based application and/or the second instance of the cloud-based application; and
upon determining that the DNS service has been reconfigured to map the custom domain of the cloud-based application to the URL of the first instance of the cloud-based application, reconfiguring the GTM cluster to at least remove, from the GTM cluster, configurations for directing the one or more requests for the cloud-based application to the first instance of the cloud-based application and/or the second instance of the cloud-based application based at least on the availability of the first instance of the cloud-based application.

12. The method of claim 11, further comprising:
determining that the first instance of the cloud-based application is operational subsequent to the reconfiguration of the GTM cluster and/or the DNS service; and
in response to the first instance of the cloud-based application being operational, reconfiguring the first cloud platform and/or the second cloud platform to at least cease a replication of configurations and/or data from the first cloud platform to the second cloud platform.

13. The method of claim 12, wherein the reconfiguration of the first cloud platform and/or the second cloud platform further includes removing, from the second cloud platform, the second instance of the cloud-based application.

14. The method of claim 13, wherein the removing of the second instance of the cloud-based application from the second cloud platform includes removing, from a database at the second cloud platform, data associated with the first instance of the cloud-based application, and wherein the data is replicated from another database at the first cloud platform to the database at the second cloud platform.

15. The method of claim 11, wherein the DNS service includes a canonical name (CNAME) record mapping the custom domain of the cloud-based application to the URL of the GTM cluster while the disaster recovery is enabled for the cloud-based application, and wherein the DNS service is reconfigured by at least modifying the CNAME record to map the custom domain of the cloud-based application to the URL of the first instance of the cloud-based application instead of the URL of the GTM cluster.

16. The method of claim 15, wherein the one or more requests for the cloud-based application are routed, based at least on the modified CNAME record, to the first instance of the cloud-based application, and wherein the modifying of the CNAME record prevents the one or more requests for the cloud-based application from being routed to the GTM cluster.

17. The method of claim 11, wherein the GTM cluster is configured to route, to the second instance of the cloud-based application, the one or more requests for the cloud-based application based at least on the first instance of the cloud-based application being unavailable.

18. The method of claim 11, wherein the request from the client comprises a ticket, and wherein the ticket is updated based at least on whether the DNS service has been reconfigured to map the custom domain of the cloud-based application to the URL of the first instance of the cloud-based application.

19. The method of claim 18, wherein the ticket is further updated to notify the client that the disaster recovery has been disabled for the cloud-based application.

20. A non-transitory computer-readable medium storing instructions, which when executed by at least one data processor, result in operations comprising:
receiving, from a client, a request to disable disaster recovery for a cloud-based application, the cloud-based application being deployed as a first instance of the cloud-based application at a first cloud platform and a second instance of the cloud-based application at a second cloud platform;
responding to the request to disable disaster recovery by at least determining that a domain name system (DNS) service has been reconfigured to map a custom domain of the cloud-based application to a uniform resource locator (URL) of the first instance of the cloud-based application instead of a URL of a global traffic management (GTM) cluster, the GTM cluster being configured to direct, based at least on an availability of the first instance of the cloud-based application, one or more requests for the cloud-based application to the first instance of the cloud-based application and/or the second instance of the cloud-based application; and
upon determining that the DNS service has been reconfigured to map the custom domain of the cloud-based application to the URL of the first instance of the cloud-based application, reconfiguring the GTM cluster to at least remove, from the GTM cluster, configurations for directing the one or more requests for the cloud-based application to the first instance of the cloud-based application and/or the second instance of the cloud-based application based at least on the availability of the first instance of the cloud-based application.

* * * * *